United States Patent
Brandner et al.

(10) Patent No.: US 6,877,627 B2
(45) Date of Patent: Apr. 12, 2005

(54) FUEL TANK

(75) Inventors: Brian W. Brandner, Kingsville (CA); Vladimir Franjo, Windsor (CA); Masahiro Higashi, Windsor (CA)

(73) Assignee: TI Group Automotive Systems, L.L.C., Warren, MI (US)

(*) Notice: Subject to any disclaimer, the term of this patent is extended or adjusted under 35 U.S.C. 154(b) by 0 days.

(21) Appl. No.: 10/352,563

(22) Filed: Jan. 28, 2003

(65) Prior Publication Data

US 2004/0144780 A1 Jul. 29, 2004

(51) Int. Cl.$^7$ ............................................... B65D 6/00
(52) U.S. Cl. .................. 220/4.13; 220/4.14; 220/62.22
(58) Field of Search ............................ 220/4.13, 4.14, 220/62.22, 562, 62.18, 560.1

(56) References Cited

U.S. PATENT DOCUMENTS

| | | | |
|---|---|---|---|
| 2,306,275 A | 12/1942 | Murray | 244/135 R |
| 2,404,418 A | 7/1946 | Walker | 220/88.1 |
| 3,426,937 A | * 2/1969 | Valentinotti et al. | 220/560.01 |
| 3,912,107 A | * 10/1975 | Baumann | 220/563 |
| 4,496,073 A | 1/1985 | Silver et al. | 220/560.11 |
| 5,072,623 A | 12/1991 | Hendershot | 73/49.2 |
| 5,314,733 A | 5/1994 | Saito et al. | 220/562 |
| 5,398,839 A | 3/1995 | Kleyn | 220/4.14 |
| 5,464,116 A | 11/1995 | Aoki et al. | 220/586 |
| 5,547,096 A | 8/1996 | Kleyn | 220/4.14 |
| 5,840,147 A | * 11/1998 | Grimm | 156/272.2 |
| 5,843,265 A | * 12/1998 | Grimm | 156/272 |
| 6,033,749 A | 3/2000 | Hata et al. | 206/524.1 |
| 6,047,747 A | 4/2000 | Bowen et al. | 141/231 |
| 6,155,448 A | 12/2000 | Ishikawa et al. | 220/562 |
| 6,391,412 B1 | 5/2002 | Hata et al. | 206/524.1 |
| 6,395,357 B1 | 5/2002 | Abu-Isa | 428/35.4 |
| 6,398,059 B1 | 6/2002 | Hayashi et al. | 220/4.13 |
| 6,409,040 B1 | 6/2002 | Distelhoff et al. | 220/4.14 |
| 6,491,180 B2 | 12/2002 | Distelhoff et al. | 220/562 |
| 6,715,626 B2 * | 4/2004 | Balzer et al. | 220/4.14 |
| 6,719,163 B1 * | 4/2004 | Delbarre et al. | 220/562 |
| 2002/0053566 A1 | 5/2002 | Balzer et al. | |

FOREIGN PATENT DOCUMENTS

| | | | |
|---|---|---|---|
| DE | 827164 | 1/1952 | |
| DE | 19946530 | 3/2001 | |
| DE | 10103149 | 8/2002 | |
| EP | 1002682 A2 | 5/2000 | B60K/15/03 |
| EP | 1108590 | 6/2001 | |
| WO | 0168365 | 9/2001 | |

OTHER PUBLICATIONS

Website of Edison Welding Institute (Laser of Welding of Plastics and Through–Transmission Infrared Welding—TTIR).*

* cited by examiner

*Primary Examiner*—Joseph Man-Fu Moy
(74) *Attorney, Agent, or Firm*—Reising, Ethington, Barnes, Kisselle, P.C.

(57) ABSTRACT

A polymeric fuel tank having a first body joined to a second body is constructed having a substantially continuously barrier layer surrounding the tank. The first body has an inner surface terminating at a free edge and a first mating surface adjacent the free edge. A first barrier layer is fixed adjacent the inner surface of the first body. The second body has an inner surface terminating at a free edge and has a second mating surface adjacent to the first mating surface and the free edge of the second body to define a fuel cavity. A second barrier layer is fixed adjacent the inner surface of the second body. At least one weld joint joins the first mating surface to the second mating surface and the first barrier layer to the second barrier layer to provide the continuous barrier layer in the fuel tank.

12 Claims, 2 Drawing Sheets

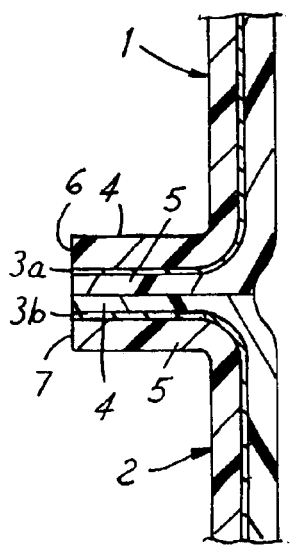
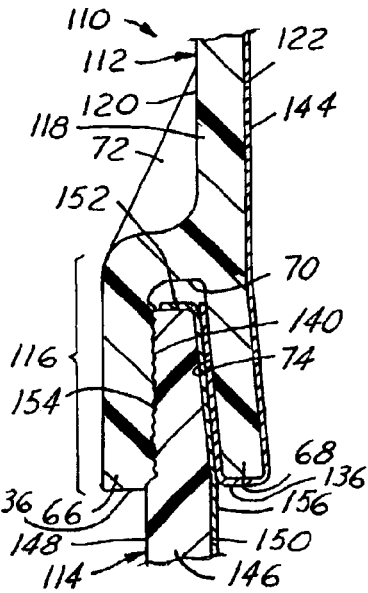
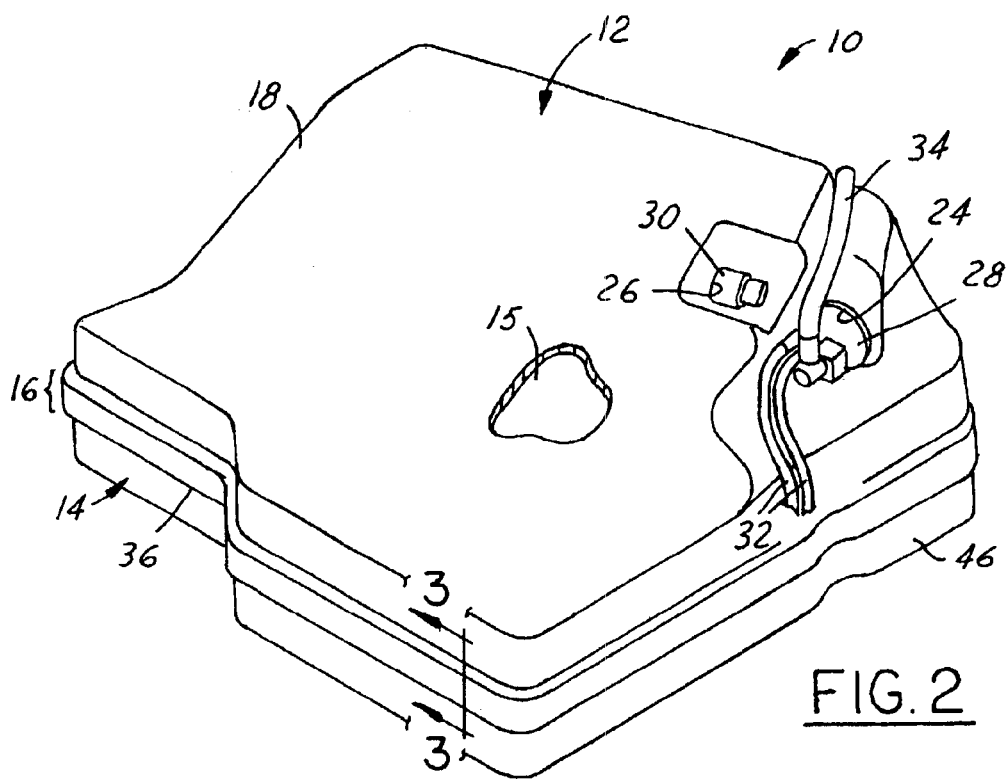

_US 6,877,627 B2_

FUEL TANK

FIELD OF THE INVENTION

This invention relates generally to fuel tanks, and more particularly to the construction of fuel tanks having at least two parts joined together.

BACKGROUND OF THE INVENTION

It is known to construct fuel tanks by bonding two separate tank halves to one another to form a single piece fuel tank. A plurality of openings are typically formed in the fuel tank to permit assembly into and communication with various components inside the fuel tank, such as a fuel pump, electrical connectors, vent valves, and the like. As shown in FIG. 1, prior to bonding the two tank halves 1,2 to one another, each half has been thermoformed out of multi-layer polymeric sheets 4,5, with a barrier layer 3a, 3b between the pair of the sheets 4,5. A typical joint for these thermoformed tanks is formed by sealing together outwardly extending flanges 6,7 of each half 1,2 of the tank.

Because the barrier layers 3a, 3b are sandwiched between the sheets 4,5, when the flanges 6,7 are joined there is a space between the barrier layers 3a and 3b that defines a permeation path. The permeation path between the two barrier layers 3a, 3b allows fuel vapors to escape through the joint formed by the mating flanges 6,7 into the atmosphere. In addition, the bonded joint creates a pair of 90° corners at the flanges, thus creating a stress point at the bonded joint of the two halves.

SUMMARY OF THE INVENTION

A polymeric fuel tank having a first body joined to a second body defining a fuel cavity is constructed having a substantially continuous barrier layer surrounding the fuel cavity. The first body has a wall with an inner surface terminating at a free edge and a first mating surface adjacent the free edge. A first barrier layer is fixed adjacent the inner surface of the first body. The second body has a wall with an inner surface terminating at a free edge and a second mating surface adjacent to the first surface. A second barrier layer is fixed adjacent the inner surface of the second body. At least one weld joint joins the first mating surface to the second mating surface and the first barrier layer to the second barrier layer. Preferably, each body has its barrier layer at least partially exposed in the area of the weld joint so that the first and second barrier layers are directly joined together to provide the continuous barrier layer in the fuel tank.

Some objects, features and advantages of the present invention include providing a construction for fuel tanks having a substantially gas impermeable joint between joined halves of the fuel tanks, providing for fuel tanks capable of withstanding the mechanical testing required for polymeric fuel tanks, providing a relatively easy and economical manufacture for the construction of fuel tanks, providing a construction for fuel tanks reducing the surface oxidation at a weld joint between mating halves of fuel tanks, providing a construction for joining mating halves of fuel tanks that is flexible in design, providing for improved strength at the joint between mating halves of fuel tanks, and providing a construction for fuel tanks facilitating improved tolerances.

It should be recognized that the above list represents only a partial listing of objects, features and advantages of the present invention, and that those skilled in the art will recognize other objects, features and advantages upon review of this disclosure in its entirety.

BRIEF DESCRIPTION OF THE DRAWINGS

These and other objects, features and advantages of this invention will be apparent from the following detailed description of the preferred embodiments and best mode, appended claims and accompanying drawings in which:

FIG. 1 is a fragmentary cross-sectional view through mating halves of a prior art fuel tank;

FIG. 2 is a perspective view with a portion broken away of a fuel tank according to one embodiment of the present invention;

FIG. 3 is a fragmentary cross-sectional view taken along line 3—3 of FIG. 2;

FIG. 4 is a view similar to FIG. 3 showing an alternate embodiment of a fuel tank;

DETAILED DESCRIPTION OF THE PREFERRED EMBODIMENTS

Figures 5, 6:
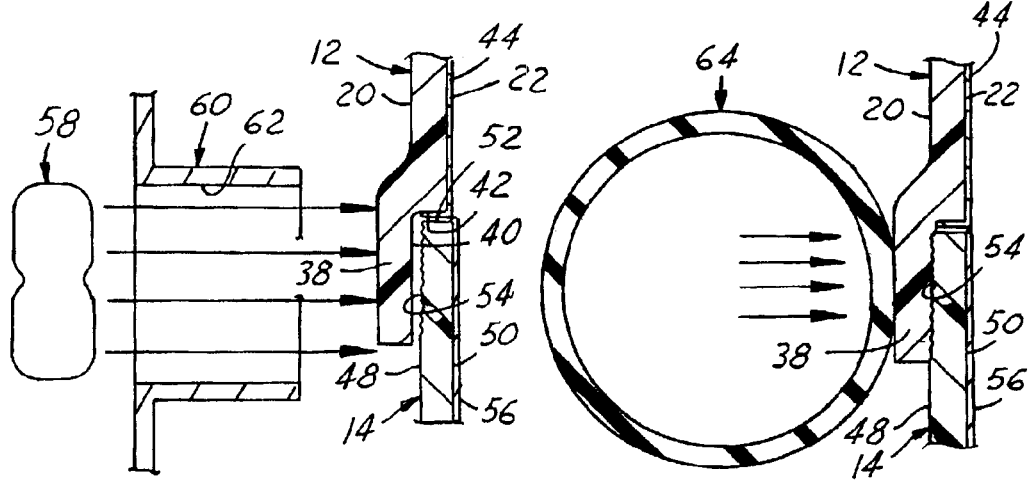
FIG. 5 is a schematic view of a preheating process in assembly of a fuel tank.
FIG. 6 is a schematic view of a pressing process in assembly of a fuel tank.

A fuel tank constructed according to a presently preferred embodiment is shown in FIG. 2 generally at 10. The fuel tank 10 has a first body 12 represented here as a cover joined to a second body 14 represented here as a base. The first and second bodies 12, 14 are fixed to one another to create a joint 16 between the first and second bodies 12, 14. The first and second bodies 12, 14 each have a barrier layer 44, 56, respectively, so that when the bodies 12, 14 are joined together, the fuel tank 10 has a substantially continuously barrier layer surrounding a fuel cavity 15 within the fuel tank 10. Preferably, both barrier layers 44 and 56 are at least partially exposed in the area of the joint 16, so that formation of the joint 16 connects the barrier layers 44, 56 to each other. Additionally, the joint 16 resists separation of the two bodies 12, 14 from one another, particularly by resisting crack formation and propagation within the joint 16.

As best shown in FIG. 3, the first body 12 has a wall 18 with an outer surface 20 and an inner surface 22. As best shown in FIG. 2, the first body 12 is shown here having a plurality of openings 24, 26 through the wall 18 for receiving a manifold 28 and an electrical connector 30, respectively. The manifold 28 has outlets for fuel lines, vent lines and typically an electrical pass-through connector. The electrical connector 30 typically provides for an electrical connection to a fuel pump, a fuel pressure sensor and/or fuel level sensor (not shown) and provides feedback to a user of the vehicle. It should be recognized that in the construction of the first body 12, it is desirable to minimize the number of openings therein to eliminate potential sources of fuel vapor leakage out of the fuel tank 10.

The wall 18 terminates at a peripheral free edge 36 that extends around a perimeter of the first body 12. Adjacent the free edge 36 and preferably extending around the perimeter of the first body 12 is an outwardly expanded lip 38 defining a first mating surface 40 and a shoulder 42 extending generally outwardly from the first mating surface 40. The first mating surface 40 is represented here as having a generally flat surface finish, though it could have an undulated surface finish to facilitate welding the first body 12 to the second body 14.

The first body 12 is preferably constructed from virgin high density polyethylene (HDPE) that is typically white in color. The first composition of HDPE is largely transmissive of infrared energy wherein approximately 30% of the infrared energy encountering the first body is absorbed and the remaining infrared energy passes through the first body 12.

Preferably, the first barrier layer 44 is fixed adjacent to the inner surface 22 of the first body 12. The barrier layer 44 may be bonded, adhered or attached to the inner surface 22 using any suitable mechanism or method as desired for the application. As best shown in FIG. 3, the first barrier layer 44 preferably extends around the shoulder 42 at least in part and is fixed thereto. The first barrier layer 44 is constructed from a material that is substantially impermeable to fuel vapors contained within the cavity 15 of the fuel tank 10, such as ethylene vinyl alcohol (EVOH), liquid crystal polymer (LCP), or the like.

The second body 14 has a wall 46 with an outer surface 48 and an inner surface 50. The wall 46 terminates at a peripheral free edge 52 and has a second mating surface 54 adjacent the edge 52 extending around the perimeter of the second body 14. Preferably, at least one of the mating surfaces 40, 54 has an undulating surface texture, shown here as the second mating surface 54, to facilitate welding the second mating surface 54 to the first mating surface 40, though the surfaces 40, 54 can remain generally flat if desired. The second barrier layer 56 is preferably fixed to the inner surface 50 of the wall 46, and preferably extends around at least a portion of the edge 52 and is fixed thereto. The second barrier layer 56 is constructed from a material substantially impermeable to fuel vapor in the fuel cavity, such as EVOH, LCP, or the like.

The second body 14 is preferably constructed from a second composition different from the first composition, and is preferably comprised of a high density polyethylene with a colored pigment suitable for absorbing infrared energy, for example, carbon-black pigment (carbon-black HDPE). The carbon-black pigment typically makes the carbon-black HDPE black in color and the carbon-black pigment generally comprises approximately 0.07%–5.00% of the HDPE by weight, and preferably comprises approximately 0.10%–0.50% of the HDPE by weight. The upper limit of 5.00% could be exceeded as long as the material properties are not adversely affected. The carbon-black HDPE absorbs approximately 90% of infrared energy. As mentioned, other colors of pigment may be employed, such as red, blue or the like.

As shown in FIGS. 5–8, in assembly, the first body 12 and the second body 14 are pressed together, preferably by an automated process, such that the first mating surface 40 of the first body 12 and the second mating surface 54 of the second body 14 are adjacent one another. Additionally, the edge 52 of the second body 14 is preferably aligned with the shoulder 42 of the first body 12 to facilitate proper alignment of the first body 12 relative to the second body 14. As such, the first barrier layer 44 is in mating contact with the second barrier layer 56 in the area of the shoulder 42 and edge 52. As best shown in FIG. 5, with the first and second bodies 12, 14 positioned relative to one another, the bodies 12, 14 are preferably pre-heated using an infrared lamp source 58, such as provided by quartz-halogen and quartz-tungsten lamps. It should be recognized that the infrared lamp source may be configured in a variety of ways to provide the desired radiation pattern. With the first mating surface 40 and the second mating surface 54 being pre-heated prior to their engaging one another, the oxidation commonly encountered in welding two surfaces to one another is prevented from occurring and the tolerances achieved can be controlled to a high level of precision.

The infrared lamp source 58 is preferably spaced a predetermined distance from the bodies 12, 14 preferably allowing for a focusing shield 60 to be positioned between the infrared source 58 and the bodies 12, 14. The focusing shield 60 is preferably made out of sheet metal and preferably has a chrome finish on an internal surface 62 to facilitate reflecting and directing the infrared radiation.

The infrared radiation emitted by the infrared lamp source 58 is directed through the focusing shield 60 and focused on the lip 38 of the first body 12 and the second mating surface 54 of the second body 14. With approximately 30% of the radiation being absorbed by the first body 12, approximately 70% of the radiation passes through to the second body 14, and approximately 90% of that radiation is absorbed by the second mating surface 54. The radiation heats the respective portions of the first and second bodies 12, 14 preferably until the lip 38 is pliable. Preferably, the wall 46 of the second body 14 remains resilient enough to resist deforming, thereby facilitate the welding process.

As best shown in FIG. 6, a pressure source, represented here as a rubber ring 64 is pressed against the lip 38 causing the first mating surface 40 to be pressed into the second mating surface 54. With the surfaces engaging one another, the first mating surface 40 and the second mating surface 54 are effectively welded together. It should be recognized that any suitable method may be used, such as rolling, pneumatic cylinders, or the like, to press the first mating surface 40 into engagement with the second mating surface 54.

Figures 7, 8:
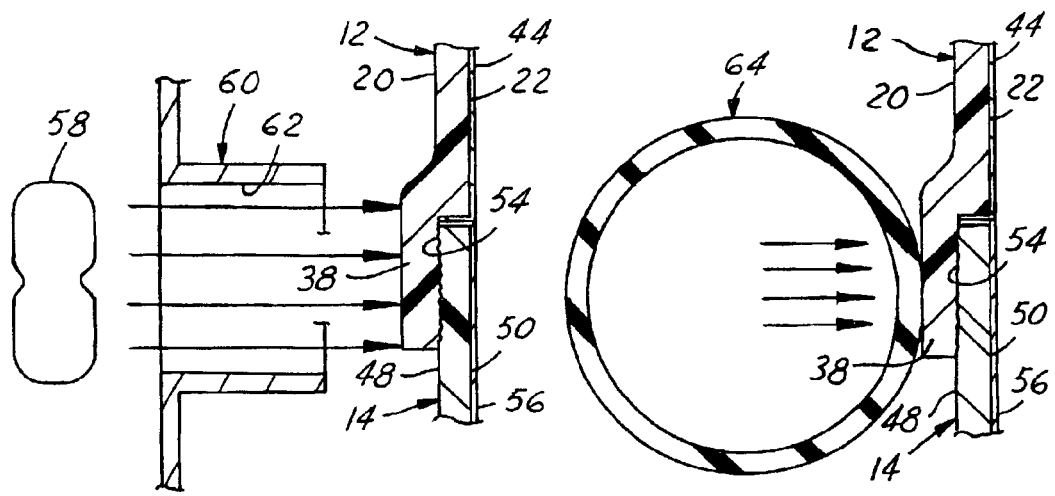
FIG. 7 is a schematic view of a reheating process in assembly of a fuel tank.
FIG. 8 is a schematic view of a final pressing process in assembly of a fuel tank.

Upon initially welding the first mating surface 40 to the second mating surface 54, as best shown in FIG. 7, additional heat is preferably provided by the infrared lamp source 58 to complete the welding process. The heat is transferred through infrared waves, and since the surfaces being welded together are in contact with one another, the temperatures on both surfaces being welded are equalized through conduction. As best shown in FIG. 8, after heating the mating surfaces 40, 54 a second time, additional pressure is preferably applied by the rubber ring 64 to achieve a final weld and final tolerancing of the fuel tank 10.

It should be recognized, that upon welding the first body 12 to the second body 14, the first barrier layer 44 and the second barrier layer 56 are attached or welded to one another such that a substantially continuous barrier layer is formed surrounding the cavity 15 of the fuel tank 10. The continuous barrier layer eliminates any high permeation path for fuel vapor to pass through, and thus inhibits fuel vapor from permeating through the walls 18, 46 of the fuel tank 10 and entering the atmosphere.

An alternate embodiment of a fuel tank 110 is shown in FIG. 4. The reference numerals are offset by 100 from the reference numerals in the embodiment described above to represent similar, but slightly modified parts. The same reference numerals are used where the parts are substantially similar as above.

A first body 112 having a wall 118 with an inner surface 122 terminating in a bifurcated peripheral free edge 136 is joined to a second body 114 at a joint 116. The bifurcated free edge 136 defines an outer lip 66 and an inner lip 68. The outer lip 66 has a first mating surface 140 and the inner lip 68 has a surface 74 defining a channel 70 between the first mating surface 140 and the surface 76. To provide additional support to the outer lip 66, preferably a rib 72 extends from an outer surface 120 of the first body 112 to the outer lip 66. The rib 72 is preferably inclined relative to the outer surface 120 to eliminate any potential stress risers from being created between the rib 72 and the outer surface 120, thus adding to the structural integrity of the fuel tank 110.

A first barrier layer 144 is fixed to the inner surface 122 of the first body 112 and preferably extends around the free edge 136 of the inner lip 68 and at least partially into the channel 70. The first barrier layer 144 may be formed from the same material as the barrier layer 44, 56 of the first embodiment.

The second body 114 has a wall 146 with an outer surface 148 and an inner surface 150. The wall 146 terminates at a peripheral free edge 152 and has a second mating surface 154 adjacent the edge 152. The inner surface 150 is preferably tapered adjacent the free edge 152 to facilitate assembly within the channel 70 of the first body 112. A second barrier layer 156 is fixed adjacent to the inner surface 150 of the second body 114 and preferably extends at least partially around the free edge 152.

Upon assembly, when the free edge 152 is inserted within the channel 70, the second mating surface 154 is adjacent and in mating contact with the first mating surface 140 of the outer lip 66. Additionally, the second barrier layer 156 is in mating contact with the first barrier layer 144 to create a substantially continuous barrier layer surrounding the fuel cavity of the fuel tank when the first body 112 and the second body 114 are joined.

It should be recognized that the heating and pressing of the inner surface 74 to the outer surface 148 is substantially similar as described above in assembling the first body 12 to the second body 14. As such, no further description is provided to detail the assembly and welding of the first body 112 to the second body 114.

It should be recognized that other configurations may be used in constructing the free ends of the first body 12, 112 and the second body 14, 114 as described and shown herein. The embodiments shown only represent the presently preferred embodiments, and should not be construed as the only embodiments providing an impermeable seal between the first and second bodies 12, 14, 112, 114 and a substantially continuous fuel vapor barrier layer in the fuel tank.

Obviously, many modifications and variations of the present invention are possible in light of the above teachings. It is, therefore, to be understood that within the scope of the appended claims, the invention may be practiced otherwise than as specifically described. The invention is defined by the claims that follow.

We claim:

1. A fuel tank, comprising:
    a first polymeric body having a wall with an inner surface with the wall having a first mating surface;
    a first barrier layer adjacent to the inner surface of the first body;
    a second polymeric body having a wall with an inner surface and having a second mating surface adjacent to the first mating surface of the first body, the first and second bodies together defining a fuel cavity;
    a second barrier layer adjacent to the inner surface of the second body with at least a portion of the second barrier layer disposed adjacent to at least a portion of the first barrier layer; and
    at least one weld joining the first mating surface to the second mating surface and the first barrier layer to the second barrier layer at least in the area where the first and second barrier layers are adjacent to each other providing a barrier layer substantially continuously surrounding the fuel cavity.

2. The fuel tank of claim 1 wherein the first body is formed of an infrared transmitting material.

3. The fuel tank of claim 1 wherein the second body is formed of an infrared absorbing material.

4. The fuel tank of claim 1 wherein the first body has a bifurcated free edge defining an outer lip and an inner lip defining a channel therebetween.

5. The fuel tank of claim 4 wherein the second body has a free edge disposed within the channel.

6. The fuel tank of claim 4 wherein the free edge of the second body is tapered to facilitate disposal within the channel.

7. The fuel tank of claim 4 wherein the first barrier layer extends around the inner lip of the first body and at least partially into the channel.

8. The fuel tank of claim 1 wherein the first body is constructed from a first material having a first composition and the second body is constructed from a second material having a second composition, the second composition being different from the first composition.

9. The fuel tank of claim 1 wherein the first body has a shoulder extending generally outwardly from the first mating surface providing for alignment of the first body relative to the second body.

10. The fuel tank of claim 9 wherein the first barrier layer extends at least in part around the shoulder of the first body.

11. The fuel tank of claim 10 wherein the second barrier layer extends at least in part around the free edge of the second body providing for mating contact of the first barrier layer with the second barrier layer.

12. The fuel tank of claim 1 wherein the second barrier layer extends at least in past around the free edge of the second body.

* * * * *

UNITED STATES PATENT AND TRADEMARK OFFICE
CERTIFICATE OF CORRECTION

PATENT NO.    : 6,877,627 B2
DATED         : April 12, 2005
INVENTOR(S)   : Brian W. Brandner et al.

It is certified that error appears in the above-identified patent and that said Letters Patent is hereby corrected as shown below:

Column 6,
Line 48, delete "past" and insert -- part --.

Signed and Sealed this

Twenty-eighth Day of June, 2005

JON W. DUDAS
*Director of the United States Patent and Trademark Office*